United States Patent [19]

Bernede et al.

[11] 4,431,865

[45] Feb. 14, 1984

[54] DIGITAL SIGNAL ENCIPHERING AND DECIPHERING APPARATUS AND SYSTEM

[75] Inventors: Georges G. Bernede, Le Plessis-Robinson; Jean M. Gregeois, Cachan, both of France

[73] Assignee: Telediffusion de France, Paris, France

[21] Appl. No.: 241,068

[22] PCT Filed: Oct. 10, 1980

[86] PCT No.: PCT/FR80/00149

§ 371 Date: Jun. 10, 1981

§ 102(e) Date: Mar. 6, 1981

[30] Foreign Application Priority Data

Oct. 10, 1979 [FR] France .................. 79 25256

[51] Int. Cl.³ .............................................. H01K 1/00
[52] U.S. Cl. .......................... 178/22.14; 178/22.19; 178/22.09
[58] Field of Search ............... 178/22.08, 22.09, 22.17, 178/22.19, 22.14; 358/122, 142; 340/706

[56] References Cited

U.S. PATENT DOCUMENTS

| | | | |
|---|---|---|---|
| 3,984,668 | 10/1976 | Zetterberg et al. | 178/22.14 |
| 4,133,974 | 1/1979 | Morgan | 178/22.17 |
| 4,323,921 | 4/1982 | Guillou | 178/22.08 |
| 4,337,483 | 6/1982 | Guillou | 340/706 |

FOREIGN PATENT DOCUMENTS 1393920 5/1975 United Kingdom .
1542350 3/1979 United Kingdom .

OTHER PUBLICATIONS

Article by Jeffery and Brandstad in Electro Conference Record, 1977, "Data Encryption", El Segundo, CA.
Communications of the ACM, vol. 17, No. 8 (8/74) pp. 437, 442, Evans et al.

Primary Examiner—Sal Cangialosi
Attorney, Agent, or Firm—Lowe, King, Price & Becker

[57] ABSTRACT

A digital signal of n-bit words $N_i$ is enciphered into an enciphered signal of n-bit words $R_i$. In an enciphering unit, a logic circuit delivers each enciphered word R through a logic operation g performed on the word N and on an n-bit, stored, enciphering word $P_{i-l}$. An addressing circuit formulates an address word $A_{i-l}$ having a bits fully or partly belonging at least to the preceding enciphered word $R_{i-1}$. A memory of $2^a$ predetermined $P_{i-l}$ words is read by each address word $A_{i-l}$ to supply a corresponding word $P_{i-l}$ to the logic circuit for it to perform the g operation such that $R_i = g(N_i, P_{i-l})$. A deciphering unit receives the enciphered words $R_i$ for formulating the address words $A_i$ controlling reading of the corresponding words $P_i$ out of $2^a$ stored words. Each deciphered word $N_i$ is obtained by a logic operation h, referred to as contrary to g, performed on the enciphered word $R_i$ and on the stored work $P_{i-l}$, such that $N = h(R_i, P_{i-l})$. The memories can be programmed by a computer, which, as per a predetermined algorithm, computes a table of words $P_i$ for a given key.

16 Claims, 4 Drawing Figures

DIGITAL SIGNAL ENCIPHERING AND DECIPHERING APPARATUS AND SYSTEM

CROSS REFERENCES TO RELATED APPLICATIONS

Applicants hereby make cross references to their Patent Application PCT/FR 80/00 149, filed Oct. 10, 1980 and claim priority thereunder following the provisions of 35 U.S.C. 119.

BACKGROUND OF THE INVENTION

1. Field of the Invention

The present invention relates to a system for enciphering and deciphering a digital signal conveying n-bit words $N_i$, wherein i denotes the rank of the word $N_i$ in the signal, into a digital enciphered signal having n-bit words $R_i$, said system comprising, in an enciphering unit at the transmitting end, logic means for performing a logic function g applied to each word $N_i$ and to a predetermined n-bit word $P_{i-1}$ to produce the corresponding enciphered word $R_i = g(N_i, P_{i-1})$ and means further comprising a register receiving the enciphered word $R_i$ to produce the words $P_{i-1}$ according to a predetermined algorithm based on the enciphered words $R_i$, and, in a deciphering unit at the receiving end, logic means for performing a logic function h, called contrary to or the complement of the g operation, applied to each enciphered word $R_i$ and to the predetermined word $P_{i-1}$ to produce the corresponding deciphered word $N_i = h(R_i, P_{i-1})$ and means analogous to these of the enciphering unit for producing words $P_{i-1}$.

2. Description of the Prior Art

The enciphering and deciphering terms are used in the present specification for the particular application to a signal conveying alphanumeric signals; however the invention is, generally speaking, related to any encrypting and decrypting, encoding and decoding or scrambling and unscrambling of a digital signal. Reference is made, hereinafter, as an examplary application, to the digital signal which is emitted from a teletext system and conveys, via a broadcasting network transmission medium, such as televized pictures network, pages of writing that will be visualized by conventional television receivers.

In a teletext system, the written pages are made up of alphanumeric characters which carry the information and characters required for the syntax and are generally transmitted in the form of 8-bit bytes. At the transmitting end, the digital signal conveying the characters is applied to multiplexing means which suitably insert it into the conventional video signal, for example into the frame synchronizing and blanking signals. After having been carried via the television link, the composition signal is received in the user's terminal and is demultiplexed to separate the digital signal from the video signal. By using a syntactical monitor, the written pages conveyed by the digital signal are reproduced for visualization by the television set.

The access controlling device embodied in a teletext system is of a conventional nature. The calling subscriber has an access means consisting of a data medium in which all the data characterizing the user and his accessible area are stored. The controlling device acquires this data and compares it, on the one hand, with the identified data which may perhaps be inside the terminal and, on the other hand, with the data characterizing the user's call. If the comparison is positive, the system "gives access" to the information.

In a broadcast teletext system, the information is received virtually everywhere and is thus accessible via straightforward technological means available to the general public. Transmission at frequencies specifically earmarked for this use would only constitute an illusory protection. The same goes for any device which would keep the information in a directly usable form. Moreover, the advent and the fast-growing spread of "household or personal" computer set-ups is placing considerable computation powers at the hands of an increasing number of people. In view of all this, it would seem essential to encipher not only the teletext system order codes, but the whole data message. This solves, incidentally, the problem of the secrecy which may well be necessary for certain institutional uses of the teletext services. Generally speaking, in an enciphered transmission system, we find:

a source of N messages belonging to the overall range of possible messages;

an enciphering unit performing a function f which, for a given message N, generates a corresponding cryptogram (resulting enciphered message) R belonging to the overall range of possible cryptograms, in accordance with the relationship:

$$R = f(N,C) = f_C(N)$$

where C is a code word known as a used enciphering key;

the transmission medium via which the enciphered messages R pass;

a deciphering unit performing the inverse function $f_C^{-1}$ of the function $f_C$ which gives rise to the initial message N, corresponding to the cryptogram R, obtained through the key C as per the relationship:

$$N = f_C^{-1}(R); \text{ and}$$

"safe" means for distributing the key C.

By looking at this organization, we can see that two fundamental problems have to be solved, namely the choice of a function f and the choice of key C together with its distribution. The present invention deals only with solving the first of these problems.

In the most frequently used enciphering and deciphering systems, the enciphering unit comprises a logic unit having two input buses. One of the input buses receives the n-bit $N_i$ words of the digital signal to be enciphered and the other input bus receives n-bit $P_i$ predetermined words. The logic operation carried out by the logic unit is usually a Modulo-2 addition; in other words, this unit contains a set of parallel exclusive OR gates, each receiving a pair of like-rank bits of two associated words $N_i$ and $P_i$. The advantages of applying this exclusive OR logic operation lies in the fact that it can be employed in the enciphering unit by applying the corresponding enciphered word $R_i$ and the predetermined word $P_i$ to the inputs of a logic unit contained in the deciphering unit which is analogous to one of the enciphering unit in order to restore the deciphering word $N_i$.

The means for producing the predetermined words $P_i$ are identical in the enciphering and deciphering units. As a rule, they comprise a random or quasi-random binary generator which are directly representative of the predetermined words $P_i$ (U.S. Pat. No. 4,133,974) or which the bits are selected and undergo logic operations, for example by means of addressing a random access memory or a read only memory, writing of which is controlled by certain bits of the random binary words (French Patent Application Nos. 2,210,307 and 2,265,221 respectively equivalent to United Kingdom Pat. No. 1,393,920 and U.S. Pat. No. 3,984,668).

The major drawback of an enciphering and deciphering system such as this is that the pseudo-random generators in the enciphering and deciphering units must be synchronized. Indeed, the same predetermined word $P_i$ must be applied in synchronism with the initial word $N_i$ to be enciphered and the corresponding enciphered word $R_i$ at the inputs of the enciphering and deciphering logic units. In other words, the enciphering operation must be started at the same time as the deciphering operation. In order to ensure that both pseudo-random generators begin operation at the same point in their operational cycle, it has heretofore been known to generate a sequence of digital bits known as "prime data". This prime data is utilized to control the starting point of operation of the pseudo-random generator at the enciphering unit. The prime data is then transmitted over the transmission medium to the deciphering unit whereupon detection, of it is utilized to control the starting point of the operation of the pseudo-random generator at the deciphering unit.

When the deciphering is linked to the message syntax, the prime data word can be inserted between the lines of the text message (French Patent Application No. 2,210,307). Should the encrypting not be linked to the message syntax, then the prime data word is transmitted first before the enciphered message. Whatever the case may be, the two pseudo-random generators are started at the same point of operation by prior identification of one and the same message key.

As a correlation to this synchronization drawback, the majority of enciphering units literally transmit this prime data word over the transmission medium, such that an unauthorized person would be able to detect the prime data by tapping into the transmission medium, inasmuch as the prime data is required to be transmitted over the transmission medium prior to the deciphering operation.

U.S. Pat. No. 4,133,974 provides a way of partly overcoming this drawback by enciphering the prime data word itself. According to this Patent, the first synchronization word called "prime data" is transmitted in full over the transmission medium, and the other synchronization words following behind are enciphered.

It will be noticed that other enciphering and deciphering systems based, not on a logic operation performed on the words to be enciphered and the pseudo-random words, but rather on a permutation and/or replacement of the enciphered words, also entail the transmission of a synchronization word from the enciphering unit to the deciphering unit. For instance, German Patent Application No. P 26 39 806.1-31, equivalent to United Kingdom Pat. No. 1,542,350 discloses that each word to be enciphered is first of all replaced by another word obtained by addressing in reading a memory which contains a predetermined table. The word read in this memory then undergoes a straightforward permutation. Consequently, the resulting enciphered word replaces the initial signal word. Once again, the encrypting and decrypting must be synchronized by a synchronization word transmitted before the enciphered message, so that the read addressing by each initial word matches the read addressing by the enciphered word corresponding to the initial word.

All the aforementioned enciphering and deciphering methods entail the transmission of a synchronization word, generally in constant periods depending on the message syntax. In other words, two identical initial messages correspond to one and the same enciphered message, thereby considerably limiting the safeguarding from any unauthorized deciphering of the enciphered message.

To take precautions agains all these drawbacks, the Article by S. JEFFERY and D. K. BRANDSTAD, entitled "Data Encryption" and published in Electro Conference Record, El Segundo, U.S.A., 1977, pages 30/4-1 to 30/6-6, discloses an enciphering and deciphering system similar to the type described in the beginning of the present specification. The means for producing the $P_i$ predetermined words are incorporated into a logic circuit loop between the output of the enciphering, respectively deciphering logic unit and an input into this logic unit. Under these conditions, the $P_i$ words are predetermined by the words to be enciphered, respectively enciphered words, themselves; put another way, this means that, at the start of the system operation, the $P_i$ word producing means synchronize themselves, with no need for transmitting a particular synchronization word. Furthermore, this self-synchronization enables two identical messages awaiting enciphering at different times to make two different enciphered messages correspond, due to the fact that the content of the $P_i$ word generating means register is, from what has gone before, different at these two times. It then follows that deciphering an enciphered message delivered by such a system is virtually impossible since the unauthorized person must know not only the different keys used together with the algorithm employed in the $P_i$ word producing means but also their initial register content.

In the aforementioned Article, the $P_i$ word generating means comprises, between an input register connected to the logic unit output and an output register connected to an input of the logic unit, a plurality of logic circuits which perform simple logic operations, such as permutations and Modulo-2 additions between bytes of the word stored in the input register and the selected key word. These logic operations are repeated a great many times by feedback into the logic circuits as a whole. It then becomes apparent that for a given incoming-message digital data rate, the word handling speed applied in these logic circuits must be high, thus contributing towards an overall system cost which is rather incompatible with the equipment available to the general public.

OBJECT OF THE INVENTION

The principal object of this invention is to provide an enciphering and deciphering system of the aforedescribed type in which the predetermined word producing means make use of logic circuits operating at the same digital data rate as the incoming passages. As will be seen at a later stage, instead of each predetermined word being calculated as per a determined algorithm for each message word, as the transmission of the message words progresses, the predetermined words according to the invention are calculated beforehand prior to enciphering the message using an algorithm predetermined by the key and then stored in a random access memory which is read at the same speed as the flow rate of the words to be enciphered, resp. deciphered words.

SUMMARY OF THE INVENTION

Accordingly, the enciphering and deciphering system is characterized in that each of the $P_{i-1}$ predetermined word producing means comprises means having their output connected to logic means for memorizing $2^a$ predetermined $P_{i-1}$ words stored at respective a-bit addresses $A_{i-1}$ and means connected to the register for read addressing said memorizing means by said $A_{i-1}$ addresses whose a-bit wholly or partly belongs to the word stored in the register.

The g and h functions, called respectively enciphering function and deciphering functions, cause an $N_i$ word of the enciphered message to correspond with each $R_i$ word of a message to be enciphered, where both have n bits. This bijection is defined by a table of stored $P_i$ words. This table is determined by a suitable software or algorithm in a computer. The computer receives a corresponding code word or key for a given message. It computes, according to the algorithm in function of the given key, the $P_i$ words and write them at respective addresses of a programmable memory which contains $2^a$ cells, each having n stages. In the computation step, prior to enciphering, respectively deciphering, the computer of the enciphering, respectively deciphering unit controls the disconnection of the addressing means and the programmable memory.

In accordance with a general embodiment, the integers n and a are different. The addressing means can include a shift register in series receiving a number n of bits of the $R_i$ words. The content of an address $A_i$ then depends, not only on the bits previously enciphered $R_{i-1}$ words, but also on the bits of the words enciphered beforehand $R_{i-1}$, $R_{i-2}$, . . . . The addressing means can further include means controlled by the computer for selecting a outputs of the register r, in function of the given key. This further contributes to enhancing the secrecy of the enciphering.

The fact that the $A_i$ addressing depends on the preceding enciphered words, endows the system, as will be seen at a later stage, with a self-synchronization property. In other words, no additional word is required to synchronize the enciphering and deciphering units, since an incorrectly enciphered word received in the deciphering unit will be followed by only a relative small number J of erroneous enciphered words, the J+1th enciphered word being assuredly suitable. This number J depends on the ratio r/n.

Moreover, to increase the transparency properties of system, the inputs of the enciphering and deciphering units can comprise a parallel-to-parallel converter converting the m-bit word digital signal to be enciphered ($m \neq n$), respectively enciphered signal sent over the transmission medium, into a digital signal of n-bit words which will be handled in this format in the enciphering and deciphering units, without altering the digital data rate in the transmission medium. Two parallel-to-parallel converters perform the inverse conversion and are provided at the outputs of the enciphering and deciphering units. The universality property of the system thus becomes enhanced, since the enciphering and deciphering operations are performed irrespective of the format of the words of the initial digital signal and, of course, of the content and syntax of the transmitted information.

The advantage of an elementary enciphering unit an an elementary deciphering unit embodying the inven tion is that they have the property of being iterative : will, with no appreciable deterioration of the propertie inherent in the system. In this respect, for a syste comprising K pairs of elementary enciphering and dec phering units, whose g and h logic functions are define as being contrary according to the foregoing relatio ships, the elementary enciphering units are series co nected in their increasing index from the input to th output of the overall enciphering unit and the elemer tary deciphering units are series connected in their d creasing index order from the input to the output of th overall deciphering unit. A structure such as this, wit at least two pairs of elementary enciphering and dec phering units, significantly increases the protection the secrecy, making deciphering virtually impossib for any third party not knowing the two tables of words assigned to the two pairs.

Lastly, another advantage of the enciphering un (respectively deciphering unit) embodying the inver tion is that its input receiving the digital signal to b enciphered and its output delivering the enciphere digital signal are of the same nature. This makes it poss ble to insert the enciphering, respectively decipherin unit in an already existing circuit line.

BRIEF DESCRIPTION OF THE DRAWING

Other advantages of the present invention will be come apparent from the following description of pre ferred embodiments of the system as illustrated in th corresponding accompanying drawings, in which.

DESCRIPTION OF THE PREFERRED EMBODIMENTS

Figure 1:
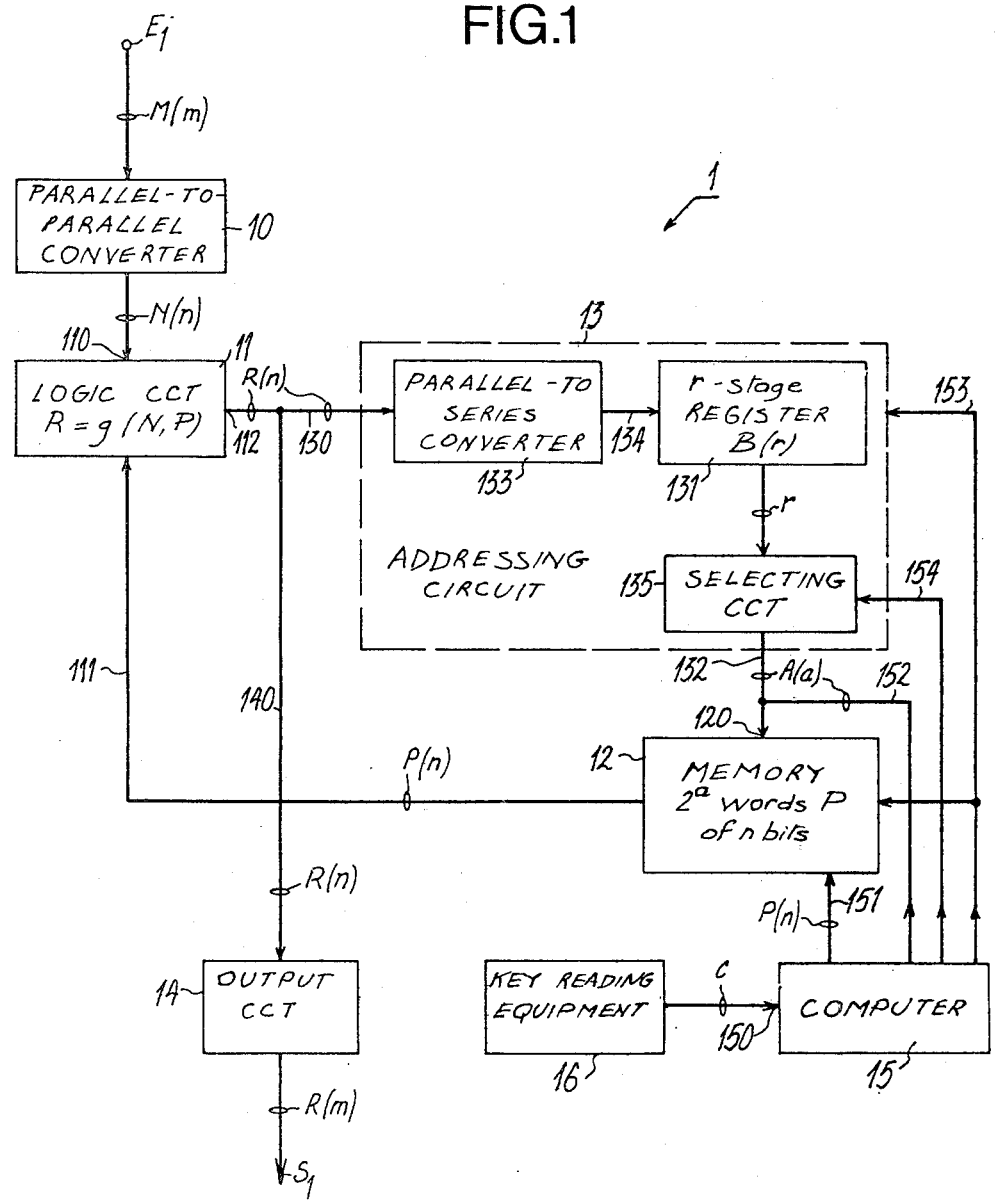
FIG. 1 is a schematic block diagram of an elementar enciphering unit in accordance with the invention.
Figure 2:
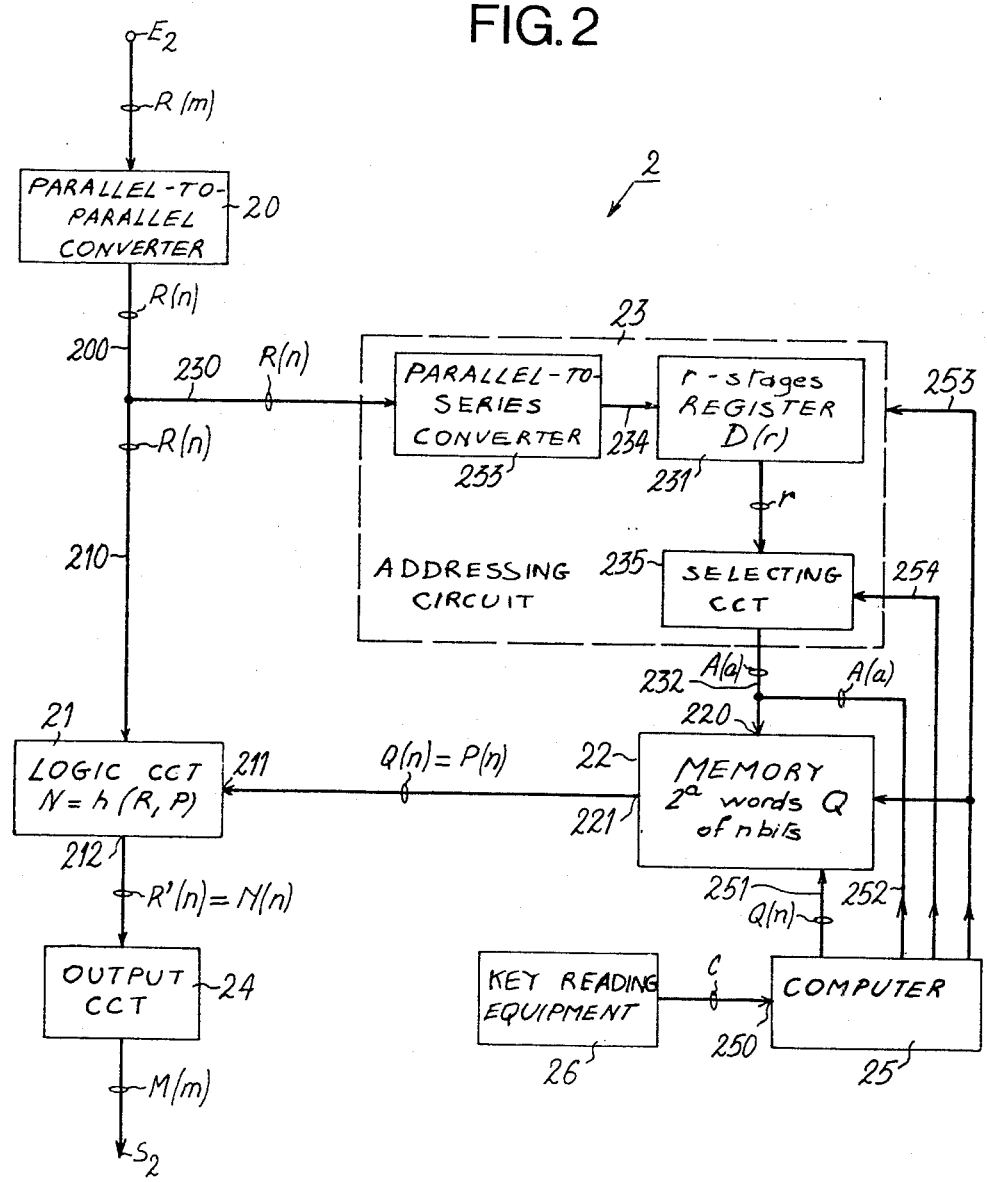
FIG. 2 is a schematic block diagram of an elementar deciphering unit in accordance with the invention; an FIGS. 3A and 3B are schematic block diagrams of system having a plurality of pairs of elementary enc phering and deciphering units analogous with those i FIGS. 1 and 2.
Figure 3A:
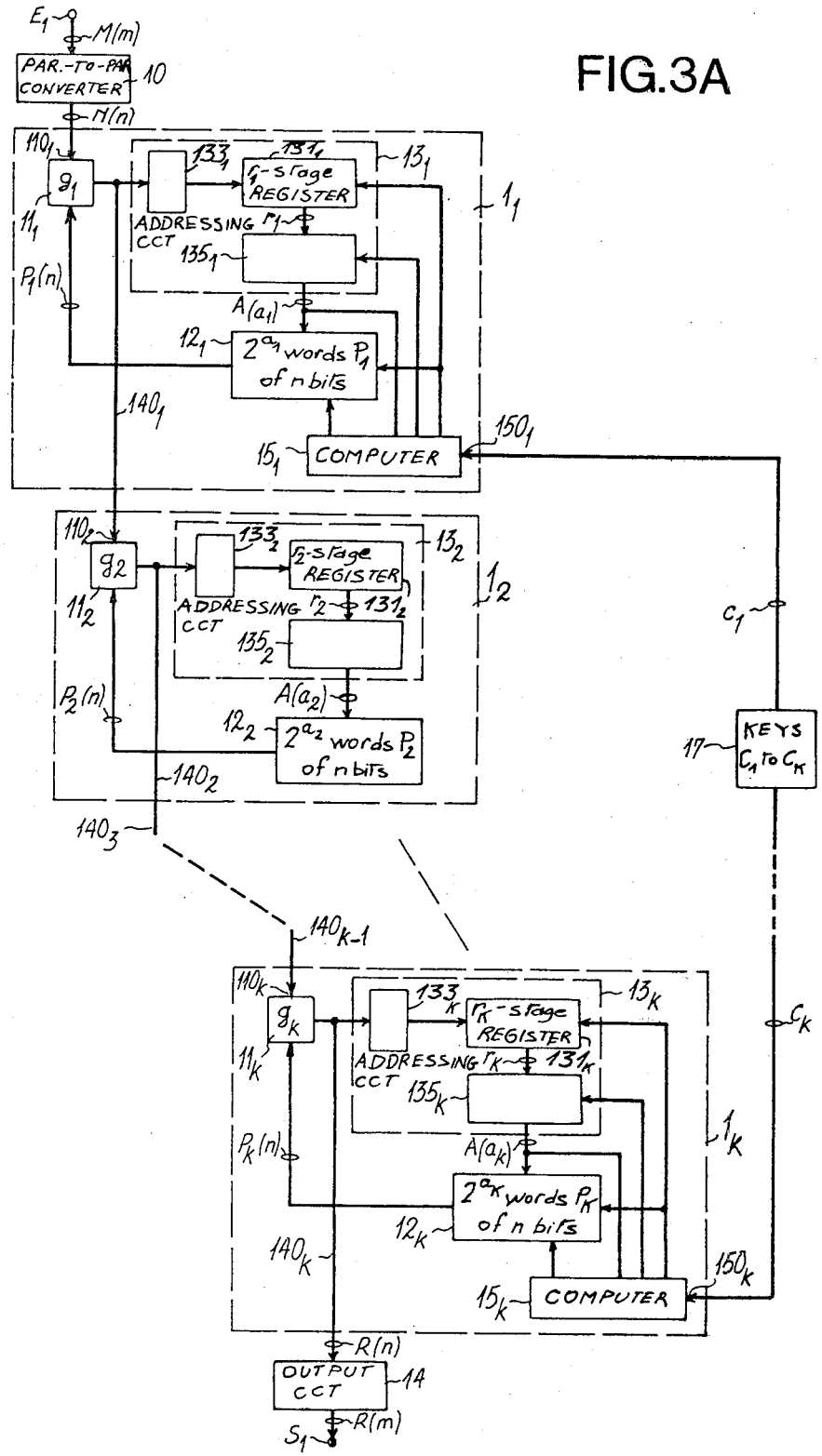
Figure 3B:
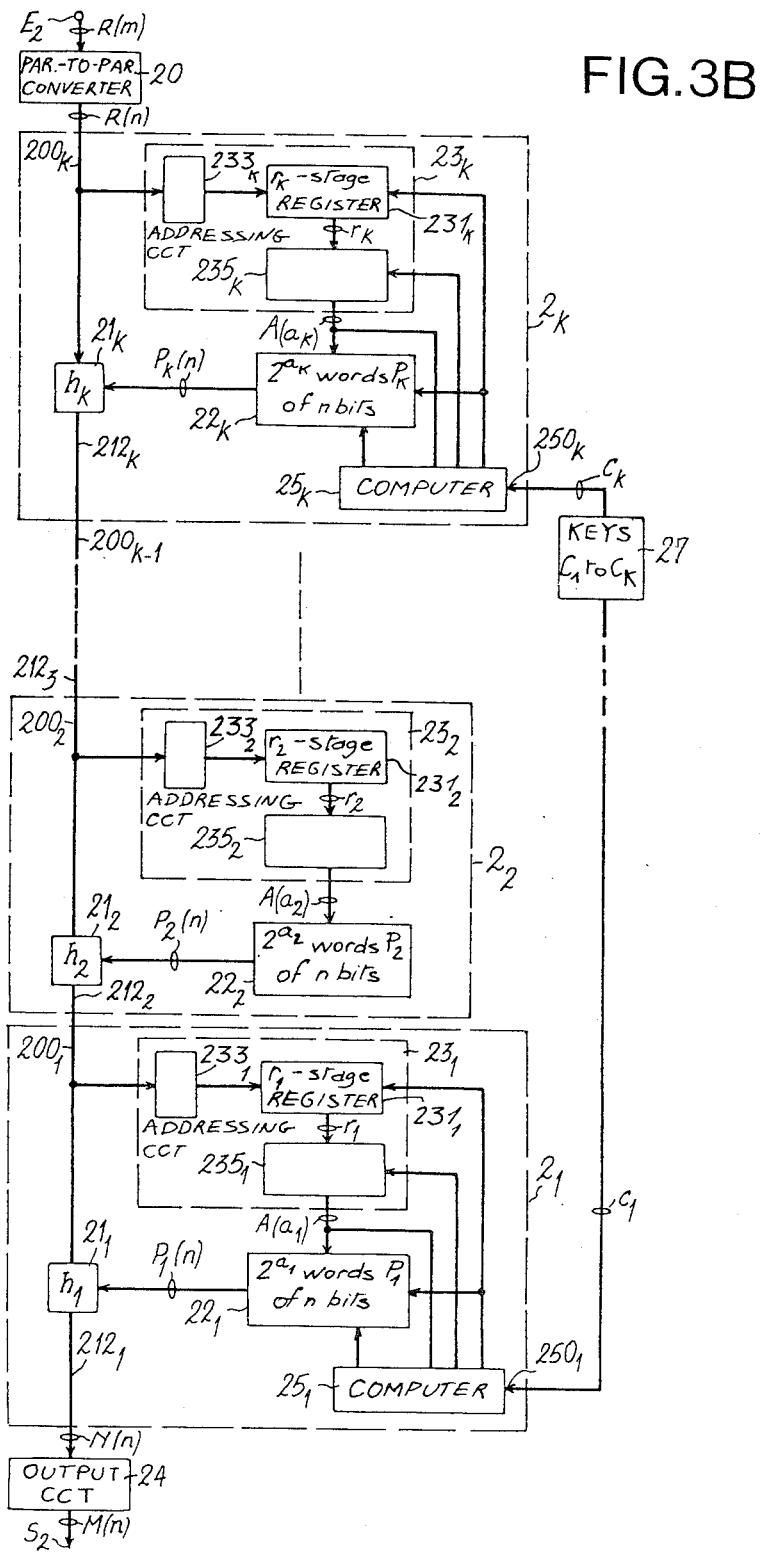

FIG. 1 schematically depicts an elementary enciphe ing unit 1 embodying the invention. It will be noticec first of all, that the links between the various blocks FIG. 1 and also of FIGS. 2, 3A and 3B are made up c parallel-wire buses, unless otherwise stated. Each bus conjointly referred to the types of parallel-bit words conveys.

The input $E_1$ of the enciphering unit 1 receives digital signal in the form of parallel m-bit binary word M(m). If need be, a parallel-to-parallel converter 1 may be provided for converting M(m) word signal int a digital signal conveying N(n) words, each having parallel bits, where the integer n is not the same as th integer m. The N(n) words are applied to n parallel fir: inputs 110 of a logic circuit 11 which performs a logi operation g. This operation covers two words $N_i(n)$ an $P_{i-1}(n)$, each having n parallel bits. The $P_{i-1}(n)$ word i selected in dependence on N(n) words which have rank less then $i-1$ and which are transmitted before th $N_i(n)$ word. The $P_{i-1}(n)$ word is delivered from a pro grammable memory 12 to n parallel second inputs 11 of the circuit 11, as will be seen at a later stage. Th output bus 112 of the circuit 11 delivers resulting $R_i(r$ words with n parallel bits, such that:

$R_i = g(N_i, P_{i-1})$

The g operation is a combinative function presenting properties sought from the statistical point of view. The $R_i$ word is supplied, via an n-wire bus 130, to an addressing circuit 13 and, via an n-wire bus 140, to an output circuit 14. The output circuit 14 comprises a buffer register preceding the output $S_1$ of the enciphering unit. Should the converter 10 be used, the output circuit 14 would include a parallel-to-parallel converter which converts the stream of R(n) words into a stream of R(m) words. Otherwise, the output circuit is necessary.

The addressing circuit 13 comprises an r-stage register 131. The output bus 132 of the addressing circuit 13 delivers a read address word A(a) of a bits (a≦r), each time an incoming R(n) word is received over the bus 130. The output bus 132 is connected to the addressing input 120 of the memory 12 which contains $2^a$ n-bit P(n) words. As a result, when the input 120 receives each addressing word A(a), the memory 12 delivers a P(n) word, via its output bus 121 to the input 111 of the logic circuit 11.

Generally speaking, the numbers n, r and a are different. In this case, the addressing circuit 13 comprises, for instance, a parallel-to-parallel series converter 133 which converts each parallel R(n) word transmitted by the bus 130 into a series word which is stored, through the input wire 134 of the register 131, in the first stages of the r-stage shift register 131. The content of register 131 progresses, n bits by n bits, in terms of the incoming R(n) words. If we have r<n, only r predetermined ranks of the R(n) word are recorded and will go towards making up the A(a) addressing word. On the other hand, if r>n, all the R(n) word bits are stored in the shift register 131. These will be used, together with the (r−n) bits previously stored and coming from the earlier R(n) words and, perhaps, from the initial register 131 content, to compose the A(a) address words. In a third embodiment, if n=r or n>r, then the converter 133 is no longer required and the register 131 becomes a simple buffer register receiving the n bits or r bits of each of the R(n) words in parallel.

Also, in the general case, r differs from a, but is, of course, greater than a. A selecting circuit 135 selects a outputs of the register 131 amongst r. This circuit 135 is conventionally comprised of r or less than r parallel AND gates and applies an A(a) word over the bus 132 each time a R(n) word is delivered on the output bus 132 of the logic circuit 11.

However, according to the embodiment wherein r=a, the selecting circuit 135 is done away with the r outputs of the register 131 are directly connected to the addressing inputs 120 of the memory 12.

It turns out that for an incoming $N_i(n)$ word supplied to the logic circuit 11, the addressing circuit 13 delivers a $A_{i-1}(a)$ word which is deducted from the content of the register 131 and which is made up of certain bits of the preceding resulting words $R_{i-1}(n), R_{i-2}(n), \ldots$. A $R_{i-1}(n)$ word is read in the cell of the memory 12 at the $A_{i-1}(a)$ address and is combined with the $N_i(n)$ word in the circuit 11 so as to produce the resulting word $R_i = g \cdot I_i, P_{i-1})$. At the N(n), respectively M(m) word rythm, incoming R(n), respectively R(m), words are applied at the output $S_1$ of the enciphering unit.

Prior to the incoming M(m) or N(n) message processing step in the enciphering unit 1, the enciphering table memory 12, which may be a programmable ROM, is first of all written in. This table is made up of $2^a$ n-bit P(n) words, certain of which may be equal. A computer 15 chiefly comprises a software-associated microprocessor which is employed for creating this table. Use of the table then merely implies incorporating circuitry and is therefore very quick and simply limited by the technology governing the circuit used. The software represents an algorithm established once and for all. Depending on a code word or key C which is received at the computer input 150, the algorithm makes it possible to compute P(n) words which are transmitted along an output bus 151 of the computer and which are respectively written into the cells of memory 12 which are addressed beforehand by the computer 15 in the form of A(a) words, through an output bus 152 connected to the memory addressing input 120. In addition, as soon as the computer 15 receives a key C at its input 150, it emits an order signal over an output wire 153 to addressing circuit 13, to register 131 in particular, and to memory 12. The addressing circuit 13 is then disconnected from the memory 12, i.e. offers a high resistance in a bus 132, and the programmable memory 12 assumes a writing or writing-reading phase when the computer 15 is designed for checking whether or not a P(n) word has been properly written in the cell corresponding to the provided address. Once the computer 15 has completed the computation and memorization step of the $2^a$ P(n) words, the circuit 12, 11 and 13, loop is re-closed and the enciphering unit processes the incoming N(n), respectively M(m), digital signal.

As a complement to this, the selection circuit 135 selecting the r outputs from the register 131 may be envisioned as being programmable. For this embodiment, for a given key C, the computer 15 addresses a address words selecting a outputs amongst r, via a bus 154 during the initial computation and memorization step.

Transmission of the key C to the computer input 150 is governed by key reading equipment 16, the operation of which depends upon the key recording medium. In general, for the enciphering unit 1 incorporated in the means for broadcasting the signal to be enciphered which is to be transmitted to various users, the reading equipment 16 comprises a key-board or coding wheels with which an alphanumeric word representative of the suitable coded key, in binary coded decimal code for instance, is assigned to each digital message which must be enciphered to make its detection selective at the user's facilities. In addition, two light-emitted diodes can be provided so as to warn the programmer that the computer 15 is in the P(n) word table computation step or has completed it, in which case the programmer will start the message transmission.

FIG. 2 schematically depicts the block diagram of deciphering unit 2 which is associated with that of the enciphering unit 1 in FIG. 1. The deciphering unit 2 is located in each of the receiving facilities.

Unit 2 comprises, as in the case of the enciphering unit 1 and identical with the latter as regards its structure from the circuit 10, 12, 13, 14 and 15 standpoint, a parallel-to-parallel converter 20, a programmable memory 22, an addressing circuit 23, an output circuit 24 and a computer 25, respectively. The differing embodiments determined by the relations between the numbers n, r and a respectively correspond to structure of circuits 20, 22, 23, 24 and 25 that are identical to those described above for the circuits 10, 12, 13, 14 and 15 of the enciphering unit 1. It can be seen that the analogous circuits and connecting bus in the enciphering and deciphering units 1 and 2 respectively carry the same two-figure number preceded by a 1 for the enciphering unit and a 2 for the deciphering unit. We will consider hereinafter the general case where the integers n, r and a are different.

The input $E_2$ of the deciphering unit 2 receives a digital message to be deciphered, which message is composed of m-parallel bit R(m) words, such as those transmitted by the output $S_1$ of the enciphering unit 1. The parallel-to-parallel converter 20 converts the R(m) words into R(n) words of n parallel bits which are transmitted from its output bus 200 to the input buses 210, 230 of a logic circuit 21 and the addressing circuit 23. As in the enciphering unit 1, the deciphering unit addressing circuit 23 transmits an address word A(a) over its output bus 232 to addressing input 220 of memory 22, each time it receives a R(n) word. The register 231 in the addressing circuit 23 also comprises r stages. When selection circuits 135 and 235 are not controlled by computers, they always select outputs of predetermined like rank of the register 131 and 231, respectively. If the addressing circuits 135 and 235 can be programmed by the respective computers 15 and 25 through the buses 154 and 254, they select outputs of the registers 131 and 231 whose ranks are programmed in terms of one and the same key C received at the inputs 150, 250 of the computers 15, 25. For the same key C, the computer 25 is subject to software identical to that of the computer 15 and supplies Q(n) words to the memory 22, via the bus 251; the Q(n) words are respectively identical to the P(n) words and correspond to A(a) addresses transmitted through the bus 252 to the addressing input 220 of the memory 22. Consequently, the computation step of the computer 25 is identical to that of the computer 15 and, after this step, the table stored in the memory 22 is identical to that stored in the memory 12, for one and the same key, i.e. each pair (A, Q) is identical to a pair (A, P).

The key reading equipment 26 of the deciphering unit 2 transmits the key C to the input 250 of the computer 25 and may be different from the equipment 16 of the enciphering unit 1. In particular, the equipment 26 can be made up of a magnetic-head type deck which reads the key C recorded on a card enabling the programme or message broadcasting organization transmitting in the enciphered digital signal R(m) mode to check on the tele-diffusion to the users.

The logic circuit 21 receives two words R(n) and Q(n) of n-bits each at its inputs 210 and 211 in synchronism. It performs an h logic function referred to as "contrary"—thus termed since it cannot be defined as a reciprocal or inverse function in the true mathematical meaning of the word—such that the resulting n-bit R' word transmitted at the output 212 of the circuit 21 is given by the following relationship:

$$R'_i = N_i = h(R_i, Q_{i-1})$$

when
$$R_i = g(N_i, P_{i-1})$$
with
$$Q_{i-1} = P_{i-1}$$

These relationships are verified when synchronization has been established between the enciphering unit 1 and the deciphering unit 2, i.e. when the content of the register 231 becomes identical to that of the register 131. When the register 231 has recorded all (r>n) or part (r<n) of a $R_i(n)$ word of rank i in its first stages, the addressing circuit 23 selects the address $A_i(a)$ in such a way that the word $Q_i(n)$, such that $Q_i(n) = P_i(n)$, is read in the memory 22. The logic circuit 21 then simultaneously receives the $R_{i+1}(n)$ and $Q_i(n)$ words over its inputs 210 and 211 and produces the word $R'_{i+1} = h(R_{i+1}, Q_i) = h(R_{i+1}, P_i)$ at its output. Now, according to the previously stated property of the h function, contrary to g, and the relationship $R_{i+1} = g(N_{i+1}, P_i)$, we obtain:

$$R'_{i+1}(n) = N_{i+1}(n)$$

It remains, however, to be shown that the synchronization is affected and to calculate the necessary lag, i.e. the required number of words that must be received by the deciphering unit 2 to achieve synchronization. Hence, in this respect, this property may be qualified as self-synchronization and no additional signal is required before the message to be enciphered upon transmission in the enciphering unit 1 and which must be deciphered upon reception in the deciphering unit 2.

At the outset, i.e. at the time of the computation and memorizing step controlled by the computer 15 of the enciphering unit 1, respectively the computer 25 of the deciphering unit 2, the contents of the registers 131 and 231 are $B_o(r)$ and $D_o(r)$, which are "run of the mill" and a priori different.

The first $N_1(n)$ word is applied to the input 110 of the enciphering logic circuit 11 which delivers the resulting word:

$$R_1(n) = g(N_1, P[B_o])$$

on the bus 112 for storing it in the register 131 and, possibly through the circuit 14, the corresponding word $R_1(m)$. The word $P[B_o]$ corresponds to that read in the memory 12 at the address corresponding to the content $B_o$ of the register 131 after selection by the circuit 135. After the $R_1(m)$ word and perhaps part of those following $R_2(m)$, $R_3(m)$ . . . , if m≠n, has been conveyed by the suitable transmission medium between the enciphering unit 1 and the deciphering unit 2, the input 210 of the deciphering unit circuit 21 receives the $R_1(n)$ word. The circuit 21 computes $R'_i(n) = h(R_1, Q[D_o])$, where $Q[D_o]$ corresponds to the word read in the memory 22 at the address corresponding to the content $D_o$ of the register 231 after selection by the circuit 235. We have, of course, $R'_i(n) \neq N_1(n)$ since deciphering was not performed with the content ($D_o \neq B_o$) of the address register 131. Moreover, $R_1(n)$ was (fully or partly) memorized in the registers 131 and 231 whose contents become $B_1(r)$ and $D_1(r)$. In this case, we note that the contents $B_1$ and $D_1$ have n identical bits at the most belonging to the word $R_1(n)$. If r≦n, the stream of words $N_2(n)$, $N_3(n)$ . . . received by the enciphering unit 1 and the stream of words $R'_2(n)$, $R'_3(n)$ . . . computed in the deciphering unit 2 then become equal. On the other hand, should r>n, then for as long as most significant bits belonging to the words $B_o(r)$ and $D_o(r)$ remain in the less significant stages of the registers 131 and 231 respectively, the contents of the registers 131 and 231 will not be identical. Correct deciphering comes about once the contents of these registers are identical, i.e. once all the $B_o$ and $D_o$ word bits have been pushed out and replaced by bits of R(n) words. This calls for the diffusion of J words along the transmission medium, where the integer J is defined by:

$J = ENT[r/n]$  if r=0 modulo (n)

r $J = ENT[r/n]+1$  if r≠0 modulo (n)

here ENT denotes the whole portion function.

The $R_{J+1}(n)$ word of rank J+1 is then deciphered correctly. J will be referred to as the self-synchronization lag.

Furthermore, it will be noted that for the same key C and the same message M(m), respectively N(n), to be enciphered, two enciphering operations on this message give a priori two enciphered messages R(m), respectively R(n), that are different, since at two given times, the initial contents $B_0(r)$ of the register 131 are a priori different. This property advantageously enhances the secrecy of the information to be transmitted.

Self-synchronization has a significant effect on the propagation of errors due to the transmission medium between the enciphering and deciphering stations. It is assumed that a $R_i(n)$ word enciphered in the enciphering unit gives, after conveyance through the transmission medium, a $R_i*(n)$ word along the bus 200 of the deciphering unit. Under these conditions, the $N_i*(n)$ word resulting from the deciphering operation performed on the $R_i*(n)$ word is wrong ($N_i*(n) \neq N_i(n)$). In addition, the deciphering of the following non erroneous $R_{i+1}(n)$ to $R_{i+J}(n)$ J words will be wrong because self-synchronization implies that J words are required for the contents of the registers 131 and 231 to become identical. If we now extend the above special case to a more general situation, should errors be transmitted in a group composed of I erroneous $R_{i*+I}(n)$ words, then $I+J$ $R_i*(n)$ to $R_{i*+I+J}(n)$ words would have to be deciphered upon reception in the deciphering unit 2 before regaining correct deciphering. The propagation of errors is, in any case, restricted to J words.

Referring now to FIGS. 3A and 3B, the block diagrams of an enciphering unit and a deciphering unit deduced from units 1 and 2 in FIGS. 1 and 2 by reiteration have been schematically shown. They respectively comprise K elementary enciphering units $1_1$ to $1_K$ as per FIG. 1 and K elementary deciphering units $2_1$ to $2_K$ as per FIG. 2.

In FIG. 3A, we find, in each elementary enciphering unit $1_k(1 \leq k \leq K)$, a loop made up of a logic circuit $11_k$ which performs the $g_k$ logic operation, an addressing circuit $13_k$ which includes an $r_k$-stage register and delivering address words $A(a_k)$ where $a_k \leq r_k$, and a memory $12_k$ which has $2^{a_k}$ cells, each recording an n-bit $P_k$ word. The input bus $110_1$ of the first elementary enciphering unit $1_1$ is connected to the input $E_1$ of the overall enciphering unit, perhaps via a parallel-to-parallel converter 10 that receives the message M(m) to be enciphered. The last elementary enciphering unit $1_K$ has its output bus $140_K$ which is connected to the output circuit 14 which transmits the enciphered message R(m) from the output $S_1$ to the transmission medium. The input bus $110_2, \ldots 110_K$ of the logic circuit $11_2, \ldots 11_K$ of an elementary enciphering unit $1_2$ to $1_K$ is connected to the output bus $140_1, \ldots 140_{K-1}$ of the preceding elementary enciphering unit $1_1, \ldots 1_{K-1}$, respectively.

Each elementary enciphering unit, such as $1_1$ or $1_K$, may incorporate a computer, such as $15_1$ to $15_K$, associated with a programmable memory, such as $12_1$ or $12_K$.

Through its input, such as $150_1$ or $150_K$, the computer receives a coded word or elementary key, such as $C_1$ to $C_K$, which is peculiar to it for a given message to be enciphered, by means of a common reading equipment 17 which is analogous to the equipment 16 already described. The recording medium of the reading equipment 17 (respectively 27 in the deciphering unit) contains a key C composed of the elementary keys and the computer addresses of the elementary enciphering units (respectively deciphering units). However, certain elementary enciphering units such as $1_2$, do not include a computer. The memory, such as $12_2$, of these enciphering units is then a read-only-memory containing the corresponding word $P_{i,k}(n)$ at each address $A_i(a_k)$. The corresponding address selection circuit, such as $135_2$, when present, is not programmable.

The elementary deciphering units $2_K$ to $2_1$ of the deciphering unit in FIG. 3B each also comprises a closed loop analogous to the loop in FIG. 2. For an elementary deciphering unit $2_k (1 \leq k \leq K)$, we find an address circuit $23_k$ and a memory $22_k$ which are identical to $13_k$ and $12_k$ in the elementary enciphering unit $1_k$. If the memories $12_k$ and $22_k$ are programmable, then the deciphering unit $2_k$ also includes a computer $25_k$ having software and microprocessor identical to those of the computer $15_k$ and which is controlled by a common reading equipment 27 analogous to equipment 26 shown in FIG. 2. As already stated, a common key is made up of elementary keys $C_k$ that are respectively addressed by the equipment 27 at the input $250_k$ of the computers $25_k$ of the corresponding elementary deciphering units $2_k$.

To ensure proper deciphering, through paired connections between an elementary enciphering unit $1_k$ and an elementary deciphering unit $2_k$, the elementary deciphering units are successively connected, in a decreasing order from index K to 1, starting from the input $E_2$ of the overall deciphering unit. The input bus $200_K$ and the deciphering unit $2_K$ is connected to the input $E_2$, perhaps through a parallel-to-parallel converter 20 if the overall enciphering unit performs a conversion from M(m) to N(n) words. The output bus $212_1$ of the logic circuit $21_1$ of the elementary deciphering unit $2_1$ is connected to the output $S_2$, via the output circuit 24. The output bus $212_K, \ldots 212_2$, of the logic circuit $21_K, \ldots 21_2$ of each elementary deciphering unit $2_K, \ldots 2_2$, is connected to the input bus $200_{K-1}, \ldots 200_1$ of the following elementary deciphering unit $2_{K-1}, \ldots 2_1$, respectively.

Each elementary deciphering circuit $2_k$, by means of its logic circuit $21_k$, performs moreover the $h_k$ function "contrary" to the $g_k$ function performed by the logic circuit $11_k$ of the corresponding enciphering unit $1_k$. The secrecy achieved by an overall enciphering/deciphering unit pairing such as this is considerably increased at the price of a far greater circuit complexity.

Moreover, if we call $j_k$ the self-synchronization lag of an elementary deciphering unit $2_k$, then the self-synchronization lag J of the overall deciphering unit composed of K elementary deciphering units $2_1$ to $2_K$ is given by the following summation:

$$J = \sum_{k=1}^{K} j_k$$

where $j_k = ENT[r_k/n]$  if $r_k = 0$ modulo (n)

or $j_k = ENT[r_k/n] + 1$  if $r_k \neq 0$ modulo (n)

As a non-limiting example, two applications of the enciphering and deciphering operations in accordance with the invention are described hereinafter.

The first application relates to a message transmitted in keeping with the specifications of the French teletext system referred to as ANTIOPE ("Acquisition Numérique et Télévisualisation d'Images Organisées en Pages d'écritures"—Digital Acquisition and Televisualization of Written-Page Organized Images—). In this system, the message is made up of pages which are to be seen by users' conventional television receivers. Each page is arranged into rows of characters. The content of one page is thus made up of characters required for setting the page and constituting the syntax, i.e. the starting point of pages, lines, line numbers, etc. Each of these alphanumeric characters is transmitted in the form of a word of 8 bits, N(8), or octets. These characters which, as a whole, constitute the message, are directly transmitted to the input 110 of the enciphering unit logic circuit 11. All the words N, R, A and P are octets and the enciphering and deciphering units have a structure dependent on the simple embodiment where m=n=r=a=8. The converters 10 and 20 are eliminated, each of the addressing circuits 13 and 23 includes only one simple 8-stage buffer register, i.e., registers 131, 231 respectively. The bus 140 outputting the enciphering unit is then connected to a video multiplex which will be used to insert the enciphered digital signal R(8) into certain lines associated with the frame synchronizing and blanking signal of a conventional colour video signal, where this signal retains its own content. In another embodiment, the enciphered digital signal R(8) can occupy video channel ("full channel" use). The enciphering unit is interconnected between the ANTIOPE message source and the multiplexer, wherein the electrical-matching use precautions are taken.

Upon reception in the user's facilities, one terminal comprises a video demultiplexer for separating out the conventional video signal transmitted to the television receiver and the enciphered digital signal R(8). The latter signal is received on input 200 of the deciphering unit which delivers the deciphered N(8) signal to an ANTIOPE syntax monitor. The syntactical monitor supplies orders to a visualization device which complies the ANTIOPE message pages presented afterwards on the receiver cathode ray tube.

Were the user not to have entered the key corresponding to the enciphering of the transmitted message in the reading equipment 26, i.e. the magazine he wishes to visualize, then the images transmitted after deciphering are completely illegible. As regards the complex enciphering introduced according to the invention, the user, no matter how expert he may be, is incapable of deciphering the visualized pages. Indeed, he must know how the table of words P=Q in the memories 12 and 22, and also the initial state $C_o(8)$ of the register 131 prior to enciphering, which a priori differs for each message transmission. Should the user determine the table of memories 12 and 22 for one message, he would still not be able to use it for another message since for each key identifying a message there corresponds a table P=Q determined by the algorithm inherent in the computers 15 and 25.

In a preferred embodiment, the logic operations g and h are the exclusive "OR" in Boolean algebra affecting each of the 8 pairs of like rank bits of the N(8) and P(8) words in the enciphering unit and the R(8) and Q(8) words in the deciphering unit. Each logic circuit 11, 2 thus comprises 8 exclusive OR gates, each one having one input connected to a wire of bus 110, 210 and on input connected to a wire of bus 111, 211. It appears tha the relationships defining the so-called "contrary" function of g $N = h(R, Q = P)$ when $R = g(N, P)$ are applicable to the exclusive OR functions g=h, de noted hereinafter by the sign $\oplus$:

$N = R \oplus P$ when $R = N \oplus P$.

A second application concerns any encrypted television system based on converting electric potentials representative of a part of a television image (line, point etc), controlled by a binary message characteristic c the received message.

A system such as this is represented by the Frenc encrypted television system referred to as DISCRE ("DISpositif de CRyptage pour Emission de Télév. sion"—encrypting device for television emission— which is for the transmission of programmes directe strictly at a group of specific televiewers. The metho brought into play by this system is based on the inver sion and the shifting, by delay circuits, of the vide signal lines, where these operations are controlled by conventional pseudo-random generator with bistabl flip-flops and wrap-arounds by logic gates of the exclu sive OR type. Two digital data words are required t operate the pseudo-random generator. The first sc called configuration word indicates the wrap-aroun performed and therefore, indentifies the stream gene ated. The second so-called synchronization wor loaded into the flip-flops at predetermined times an indicates the start of the stream.

In the DISCRET system, the synchronization wor is periodically modified by conveying its binary conter using a procedure established by the French DIDO] system (DIffusion de DONnées—data diffusion— which is identical to that of the conveyance laid dow by the ANTIOPE system. In accordance with the ir vention, the enciphering and deciphering operatior performed by enciphering and deciphering units a shown in FIGS. 1 and 2 are applicable, as regards M(n or N(n) words, to the synchronization words of th DISCRET system.

In another application, further to the preceding on the enciphering unit of FIG. 1 has its input $E_1$ cor nected to the output of the DISCRET system pseudc random generator. In the receiver, the deciphering un of FIG. 2 is connected upstream of the pseudo-randoi generator and delivers the deciphered stream at its ou put $S_2$. The configuration word, which does not u dergo enciphering and deciphering, can be used as a ke C and, therefore, can be transmitted to the inputs 15 250 of the computers 15, 25.

Generally speaking, it will be noted that a run-of-mill digital signal of the pseudo-random type, but also noise signal, can be retransmitted without losing an data at the deciphering unit output, after having unde gone enciphering and deciphering operations in acco dance with the invention.

We claim:

1. An enciphering and deciphering system for enciphering and deciphering a digital signal having n-bit words $N_i$, wherein the integer i denotes the rank of said word $N_i$ in said signal, into a digital enciphered signal having n-bit words $R_i$, said system comprising an enciphering unit at the transmitting end and a deciphering unit at the receiving end, said enciphering unit including: logic means for combining each word $N_i$ and an n-bit predetermined word $P_{i-1}$ in accordance with a logic function g to produce a corresponding enciphered word $R_i = g(N_i, P_{i-1})$, and means comprising a register for receiving the enciphered words $R_i$ to produce the words $P_{i-1}$ according to a predetermined algorithm based on the enciphered words $R_i$;

said deciphering unit including logic means for combining each enciphered word $R_i$ and said predetermined word $P_{i-1}$ in accordance with a logic function to produce a deciphered word $N_i = h(R_i, P_{i-1})$ corresponding to the enciphered data word, the h function being contrary to the g function, means analogous to these of said enciphering unit for producing said words $P_{i-1}$; each of said $P_{i-1}$ predetermined word producing means having an output connected to the corresponding logic means of the deciphering means for storing $2^a$ predetermined words $P_{i-1}$ stored at a respective a-bit address $A_{i-1}$, and means connected to the corresponding register for addressing said storing means by said $A_{i-1}$ addresses having a-bits belonging at least wholly to the word stored in the corresponding register.

2. The system of claim 1 wherein each of the enciphering and deciphering means further includes a parallel to series converter responsive to the enciphered word $R_i$ derived by the respective logic means, each register being an r-stage shift register for series receiving said enciphered words $R_i$ as derived by the converter.

3. The system of claim 1 wherein each register comprises plural stages, r, less than or equal to n, means for feeding r parallel bits having predetermined rank of each of said enciphered words $R_i$ to the r stages of each register.

4. The system of claim 2 or 3, wherein each of said addressing means comprises means for selecting signals from a stages out of the r stages of said register to transmit said a-bit addresses $A_i$ to said storing means.

5. The system of claim 1, 2 or 3, wherein said memoing means is a read memory containing said predetermined words $P_i$ at the corresponding addresses $A_i$.

6. The system of claim 1 wherein said enciphering it is responsive to a digital signal having m-bit words m) and comprises: first input parallel-to-parallel converting means for converting the digital signal having bit words M(m) into said digital signal having n-bit words and first output parallel-to-parallel converting means for converting said n-bit enciphered digital signal words into an enciphered digital signal having m-bit words R(m); and said deciphering unit comprises: second input parallel-to-parallel converting means for converting said digital signal having m-bit words R(m) into said digital signal having n-bit enciphered words, and a second output parallel-to-parallel converting means for converting said digital signal having n-bit deciphered words into the deciphered digital signal having m-bit words M(m).

7. An enciphering and deciphering system for enciphering and deciphering a digital signal having n-bit words $N_i$, wherein the integer i denotes the rank of said word $N_i$ in said signal, into a digital enciphered signal having n-bit words $R_i$, said system comprising an enciphering unit at the transmitting end and a deciphering unit at the receiving end, said enciphering unit including first logic means for combining each word $N_i$ and an n-bit predetermined word $P_{i-1}$ in accordance with a logic function g for deriving a corresponding enciphered word $R_i = g(N_i, P_{i-1})$ and means comprising a first register responsive to the enciphered word $R_i$ for deriving the words $P_{i-1}$ according to a predetermined algorithm that is a function of the enciphered words $R_i$, said deciphering unit including second logic means for combining each enciphered word $R_i$ and said predetermined word $P_{i-1}$ in accordance with a logic function h to produce the corresponding deciphered word $N_i = h(R_i, P_{i-1})$, function h being contrary to function g, and means comprising a first register responsive to the enciphered word $R_i$ for deriving the words $P_{i-1}$ according to a predetermined algorithm that is a function of the enciphered words $R_i$, each of said $P_{i-1}$ predetermined word producing means comprising a programmable memory connected between the respective register and logic means for storing $2^a$ predetermined words $P_{i-1}$ at respective a-bit addresses $A_{i-1}$, the means for storing being addressed by said register, and computing means for (a) disconnecting said register and said memory before enciphering and deciphering to compute the words $P_i$ per a predetermined algorithm and selectively in terms of a predetermined code word and (2) for supplying said computed $P_i$ words to said respective addresses $A_i$ in said programmable memory.

8. The system of claim 7 further comprising separate means connected between an output of said respective register and the address input of said respective memory for selecting a outputs of said respective register out of r to supply said a-bit addresses $A_i$ to said address input of said respective memory.

9. The system of claim 8 wherein said selecting means is controlled by said computing means to select a outputs of said register out of r-bits of said predetermined code word.

10. The system of claims 1, 2, 3, 6, 7, 8 or 9 wherein:
said enciphering means comprises a plurality, (K) of said enciphering units, the enciphered word output of the logic means of enciphering unit of rank k ($1 \leq k \leq K$) being connected to the word-to-be-enciphered input of the logic means of the enciphering unit of rank k+1, and
said deciphering means comprises a plurality (K) of said deciphering units in series, the deciphered word output of the logic means of deciphering unit of rank k being connected to the word-to-be-deciphered input of the logic means of the deciphering unit of preceding rank.

11. The system of claim 10 further including means for reading said predetermined code word (C), wherein the pair of the enciphering and deciphering units of the same rank k including the computing means is connected to means for reading said predetermined code word (C), said code word including elementary code words respectively assigned to the pair of said enciphering and deciphering units.

12. Apparatus for enciphering or deciphering a multi-bit input word having n-bits, the input word being a signal to be enciphered into a coded output when the apparatus performs an enciphering function, the input word being a coded signal to be deciphered when the apparatus performs a deciphering function, comprising means for deriving a multi-bit enciphering word having n-bits, a logic circuit responsive to the input and enciphering words for deriving a multi-bit output word having n-bits, each bit of the output word being responsive to the combination of a predetermined logic function of a bit of the input word and a bit of the enciphering word, each bit of the input word being combined with a different bit of the enciphering word to form one bit of the output word, the enciphering word deriving means including: an addressable memory for deriving the enciphering word having n-bits, and means responsive to the output word at time $t_1$ for addressing the memory to read out an enciphering word to which the logic circuit is responsive at time $t_2$, where time $t_2$ is subsequent to time $t_1$.

13. The apparatus of claim 12 wherein the memory is addressed by a word having m-bits, where m is an integer different from n, the addressing means including register means responsive to the output word for converting the n-bits of the output word into an m-bit address word.

14. The apparatus of claim 13 further including means for at will varying which of the n-bits of the output word are supplied as the n-bits of the address word.

15. The apparatus of claim 12 further including means for at will varying the contents of the memory words addressed in response to the output word and supplied as the enciphering word to the logic means.

16. The apparatus of claim 12 wherein the logic circuit includes n logic elements each having the same input-output functional relation, the n-bits of the input word being simultaneously applied to a first input of the n logic elements, the n-bits of the enciphering word being simultaneously applied to a second input of the n logic elements, the n-bits of the output word being simultaneously derived from an output of the n elements.

* * * * *